United States Patent [19]

Shuman

[11] Patent Number: 4,998,011

[45] Date of Patent: Mar. 5, 1991

[54] FLAT PLATE FOCUS SENSING APPARATUS

[75] Inventor: Curtis A. Shuman, Colorado Springs, Colo.

[73] Assignee: Applied Magnetics Corporation, Goleta, Calif.

[21] Appl. No.: 438,708

[22] Filed: Nov. 17, 1989

[51] Int. Cl.⁵ .............................................. G01J 1/20
[52] U.S. Cl. ............................... 250/201.5; 369/44.23
[58] Field of Search .................. 250/201.5; 369/44.23; 350/286, 276 SL

[56] References Cited

U.S. PATENT DOCUMENTS

| | | |
|---|---|---|
| 3,992,574 | 11/1976 | Bouwhuis et al. . |
| 4,253,723 | 3/1981 | Kojima et al. . |
| 4,334,300 | 6/1982 | Arquie et al. . |
| 4,358,200 | 11/1982 | Heemskerk et al. . |
| 4,399,529 | 8/1983 | Leterme et al. . |
| 4,422,168 | 12/1983 | Ito et al. . |
| 4,423,495 | 12/1983 | Musha et al. . |
| 4,423,496 | 12/1983 | Opheij et al. . |
| 4,425,636 | 1/1984 | Musha et al. . |
| 4,441,175 | 4/1984 | Shuman . |
| 4,447,722 | 5/1984 | Saimi . |
| 4,450,547 | 5/1984 | Nakamura et al. . |
| 4,453,239 | 6/1984 | Musha et al. . |
| 4,455,085 | 6/1984 | Kato et al. ........................ 250/201.5 |
| 4,458,980 | 7/1984 | Ohki et al. . |
| 4,489,408 | 12/1984 | Verhoeven et al. . |
| 4,504,938 | 3/1985 | Tajima . |
| 4,507,766 | 3/1985 | Saimi et al. . |
| 4,525,625 | 6/1985 | Abe . |
| 4,542,492 | 9/1985 | Leterme et al. . |
| 4,612,437 | 9/1986 | Ohsato . |
| 4,689,481 | 8/1987 | Ono . |
| 4,691,098 | 9/1987 | Maeda . |
| 4,733,065 | 3/1988 | Hoshi et al. ........................ 250/201.5 |
| 4,823,335 | 4/1989 | Shikama et al. .................. 369/44.23 |
| 4,862,442 | 8/1989 | Tadokoro et al. . |
| 4,876,680 | 10/1989 | Misawa et al. .................... 369/44.23 |

Primary Examiner—David C. Nelms
Assistant Examiner—Khaled Shami
Attorney, Agent, or Firm—Knobbe, Martens, Olson & Bear

[57] ABSTRACT

An optical element microstructure detects changes in the propagation angle of an optical beam on a local basis. The optical element microstructure preferably comprises an array of structures which are small compared to the size of the beam. Detection is done on a local basis, with each optical element in the microstructure array perturbing the optical beam in a predictable manner. By virtue of the number of optical sensing elements, the microstructure array is less sensitive to flaws in the optical elements, as compared to a single optical component placed in the path of the light. In addition, the microstructure lends itself to mass production by replication, and other low cost methods such as injection molding.

34 Claims, 8 Drawing Sheets

FLAT PLATE FOCUS SENSING APPARATUS

BACKGROUND OF THE INVENTION

1. Field of the Invention

The present invention relates generally to the field of collimation and angle sensing structures. More specifically, the present invention is directed toward devices capable of detecting and measuring small changes in the propagation angle of an optical beam.

2. Discussion of the Related Art

In a conventional optical disc memory system, a beam of light from a light source is caused to converge on the surface of an optical disc by an objective lens. The surface of the optical disc has recorded thereon information in the form of depressions, pits, ridges, or other optically detectable changes in the reflective or transmissive properties of the disc. In a reflective type system, the beam is reflected from the disc in such a manner that it is modulated in accordance with the information recorded on the disc. The reflected laser beam is then directed onto the detecting face of a photodiode or other light detector which transforms the optical signal into an electrical signal. In this manner, the electrical signal carries the same information recorded on the disc and contained in the modulated light beam. This electrical signal is further processed, and ultimately results in the audio sounds or video images represented by the information recorded on the disc.

For accurate reading of the information stored on the disc, it is necessary that the beam of light be accurately focused on the recorded surface of the optical disc. When the light beam is focused on the disc, the information recorded thereon will be properly modulated onto the light beam.

Most of the methods that yield focus error signals rely on basic optical principles. In general, if the laser beam is in focus on the disc, the scanning spot reflected by the disc will be imaged back onto itself. For example, in one method, a collimated optical light beam is focused by an objective lens onto the optical disc such that a portion of the incident light beam is reflected from the disc back along the same optical path as the incident light beam. If the incident light beam is properly focused on the disc, then the reflected light beam will also be collimated after it passes through the objective lens in the reverse direction. By introducing some asymmetry into the light path of the reflected beam, it is possible to detect deviations from the optimum focus of the light beam on the disc. Many of such detection and measurement techniques utilize a lens or a prism to deflect or otherwise sample the reflected beam. The reflected light beam is then analyzed for characteristics indicative of focus errors.

In one class of methods, focus errors can be detected by measuring the degree to which the collimation of the reflected beam differs from the collimation of the incident beam. These measurements are often performed by detecting and measuring small angular deviations within the reflected light beam. Detecting and measuring small changes in the propagation angle of an optical beam may also be useful in many other fields. In optical memory systems, these techniques can be used to detect focal errors produced by changes in the distance between an objective lens and the media surface of an optical disc. Such focal errors are generally caused by warped or slightly eccentric discs. The objective lens is generally mounted on, and its position controlled by, a servo mechanism which moves along a direction parallel to the optical axis of the light beam, i.e., either increasing or decreasing the distance along the optical axis, between the objective lens and the optical disc. Movement of the objective lens with respect to the disc adjusts for any out-of-focusing conditions of the light beam on the surface of the disc which may occur. A focus error detection device is placed in the path of the reflected beam to detect focus sensitive changes and to produce correction signals which can be used as input to the servo mechanism.

Focus error detection systems have been previously proposed for controlling the movement of the objective lens with respect to the media surface of the optical disc. U.S. Pat. No. 4,691,098 to Maeda, for example, describes a focus control device in which an element, comprising alternating absorbing parts (which prevent the transmission of light) and transmitting parts (which allow light to pass through the structure), is positioned in the light path of the reflected beam. Each absorbing part forms a predetermined angle with respect to the optical axis, while each transmitting part is defined by its adjacent absorbing parts. A split detector is positioned behind the element and generates an output signal which is proportional to the difference of the quantity of light incident on each half of the detector. The quantity of light received by each half of the detector thus depends on the degree to which the absorbing parts of the optical element eclipse the incident light.

Ohsato, in U.S. Pat. No. 4,612,437 is directed toward a focus error detecting device which utilizes a compound lens, consisting of first and second lens regions, each having different focal lengths. The first region of the compound lens has a focal point which converges in front of a photodetector, while the second region of the compound lens converges to a point behind the photodetector. The photodetector is positioned midway between the focal points of the two lens regions. The photodetector comprises first and second photodetecting elements for receiving light which has passed through the first region of the compound lens, and third and fourth regions for receiving light which has passed through the second region of the compound lens. The difference between the sum of the signals from the first and fourth elements and the sum of the signals from the second and third elements produces a focus error signal. When the light beam is properly in focus on the disc, the difference of these sums will be zero. Conversely, if the light beam is not properly focused on the disc, one of the sums of the signals will be larger than the other, indicating the degree and direction of the focal error.

Many such previous methods have been found disadvantageous in that the focusing techniques require the beam to propagate over quite some distance before a measurement can be made. This distance requirement intrinsically puts a minimum limit on the size of the optical system. In addition, focusing systems that utilize prisms or lenses are typically larger than the reflected beam, occupying a large amount of space and increasing the weight of the system. Further, the manufacturing costs involved in producing optical components of at least moderate quality can be prohibitive.

SUMMARY OF THE INVENTION

Briefly, the present invention is for a device capable of detecting and measuring small changes in the propagation angle of an optical beam. The present invention utilizes an optical element microstructure which detects changes in the propagation angle of the optical beam on a local basis. The optical element microstructure preferably comprises an array of optical structures which are small compared to the size of the beam. Because the detection is done on a local basis, sensing can be accomplished in a much smaller space than heretofore possible. Further, due to the increased number of optical sensing elements, the microstructure array is less sensitive to flaws in the optical elements, as compared to a single optical component placed in the path of the optical beam. Moreover, because the microstructure is less sensitive to flaws than would be a single piece optical element, production costs can be significantly reduced by utilizing standard replication techniques, such as injection molding.

In one aspect of the invention, an array of microprisms, adjusted such that the hypotenuse of each microprism is near the critical angle for total internal reflection, is provided as the focus sensitive optical component. This configuration utilizes the critical angle principle to determine which portion of incident light will be transmitted through the array or reflected out of the array upon striking the microstructure. Preferably, the hypotenuse of each microprism is adjusted such that the surface transmittance is about 50%. A detector, positioned behind the microstructure, will sense the intensity of the refracted light to determine the focus condition of the beam passing through the microstructure. Thus, with collimated light, each side of the detector would receive about 50% of the full beam intensity, and their difference would be zero, indicating correct focus at the disc.

When the beam decollimates, one side of the detector would receive more than 50% of the full beam intensity, and the other side would receive less. The magnitude and the sign of the difference in light intensity of the two halves would then indicate the amount and direction of the focus error at the disc. Thus, depending on the propagation angle of the beam incident on the microstructure, light will be partially reflected and absorbed within the microstructure, and partially refracted out of the microstructure.

In another aspect of the present invention, the optical component is a laminar structure, having alternating layers of substantially transparent optic plates and light absorptive material. Preferably, the light absorptive material has an index of refraction which is less than that of the transparent optic plates. The plates are arranged such that each layer is oriented near the critical angle for total internal reflection. Preferably, the layers are arranged such that the surface transmittance is about 50%. Thus, if the beam sample is collimated, each side of the detector will receive about 50% of the full beam intensity, and the difference of intensity on the two sides would be zero, indicative of a properly focused condition. Significantly, the angular sensitivity of this component can be enhanced by adjusting the microstructure such that multiple reflections occur within a single transparent optic plate.

In yet another aspect of the invention, an array of cylindrical microlens bars is provided as the optical component. Preferably, each cylindrical microlens is a converging lens, having substantially the same radius of curvature, so that the focal point of each converging cylindrical microlens lies in substantially the same plane, parallel to the array of microlenses. An array of grating bars is also provided, such that an edge of each grating bar is positioned at the focal point of a corresponding cylindrical microlens bar.

If light incident on each cylindrical microlens is substantially perpendicular to the surface of the array of microlenses, it will converge at the focal point of the microlens and will graze the edge of the grating bar. If, however, incident light strikes the array of microlenses at an angle with respect to the normal, the transmitted light will come to focus at a different focal point. Depending upon the angular displacement of the light with respect to the surface normal to the microlenses, the focal point will be shifted above or below the edges of the grating bars, so that a varying amount of light intensity will be transmitted to the detector.

In still another aspect of the present invention, the optical component comprises a laminar interference filter element. This element is made up of a plurality of flat optic plates each having a multilayer interference coating applied to one surface. Preferably, each optic plate is adjusted such that incident light will undergo at least two reflections prior to being transmitted through to the detector. This high reflectivity is due to the interference effect and can be enhanced by multiple reflections of the incident light.

As is well known in the art, the transmission properties of an interference filter can be optimized to specific wave lengths. Thus, the interference filter can be designed to transmit a very narrow band of wavelengths, which reduces the effects of ambient light on the system. This is significant in that ambient light may interfere with the reflected light beam incident on the laminar interference filter, thus causing the system to generate false error signals.

BRIEF DESCRIPTION OF THE DRAWINGS

Further objects, features and advantages of the instant invention will become apparent from the ensuing detailed description, when considered together with the appended drawings in which.

DETAILED DESCRIPTION OF THE INVENTION

Figure 1:
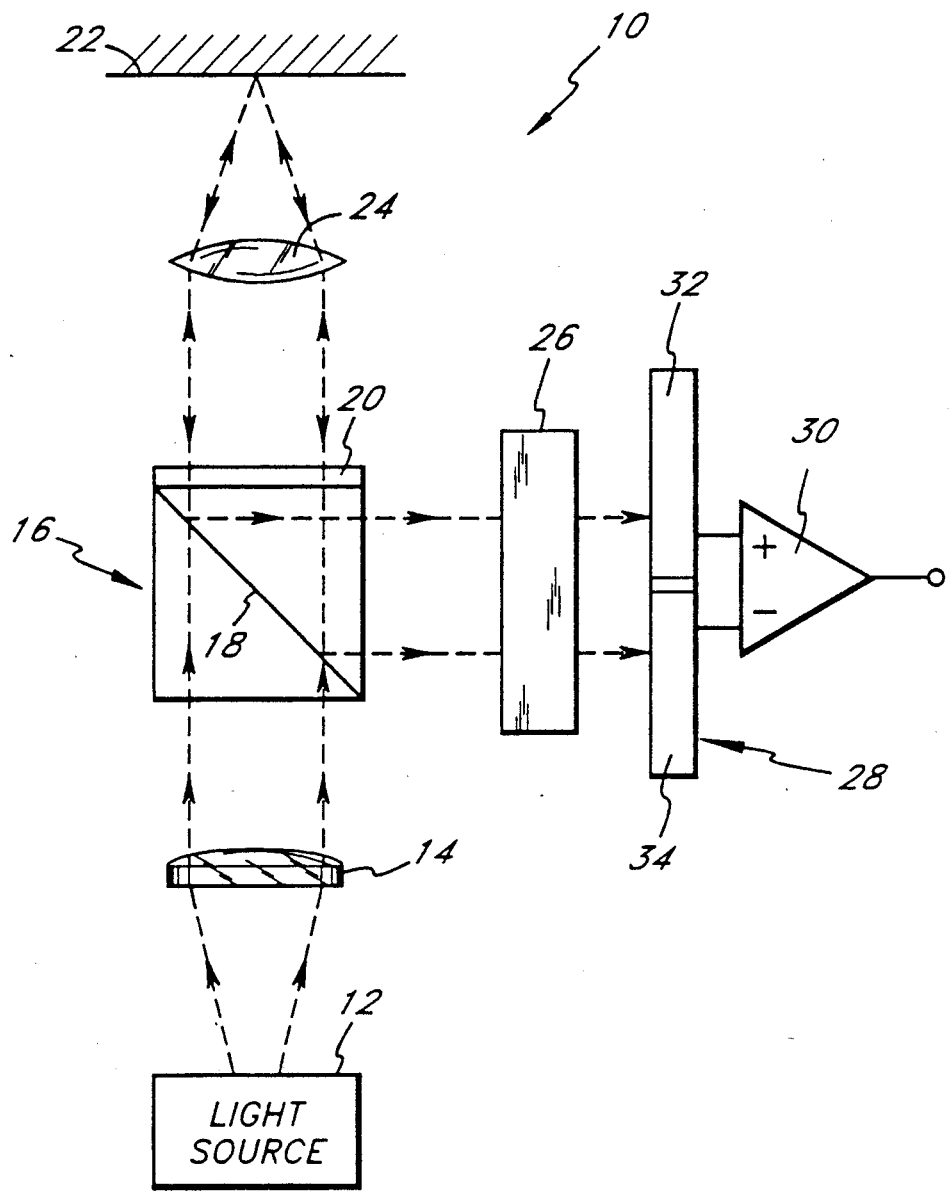
FIG. 1 is a schematic representation of an optical system for detecting the propagation angle of a reflected optical beam in which the beam is properly focused on the surface of an optical disc.
Figure 2:
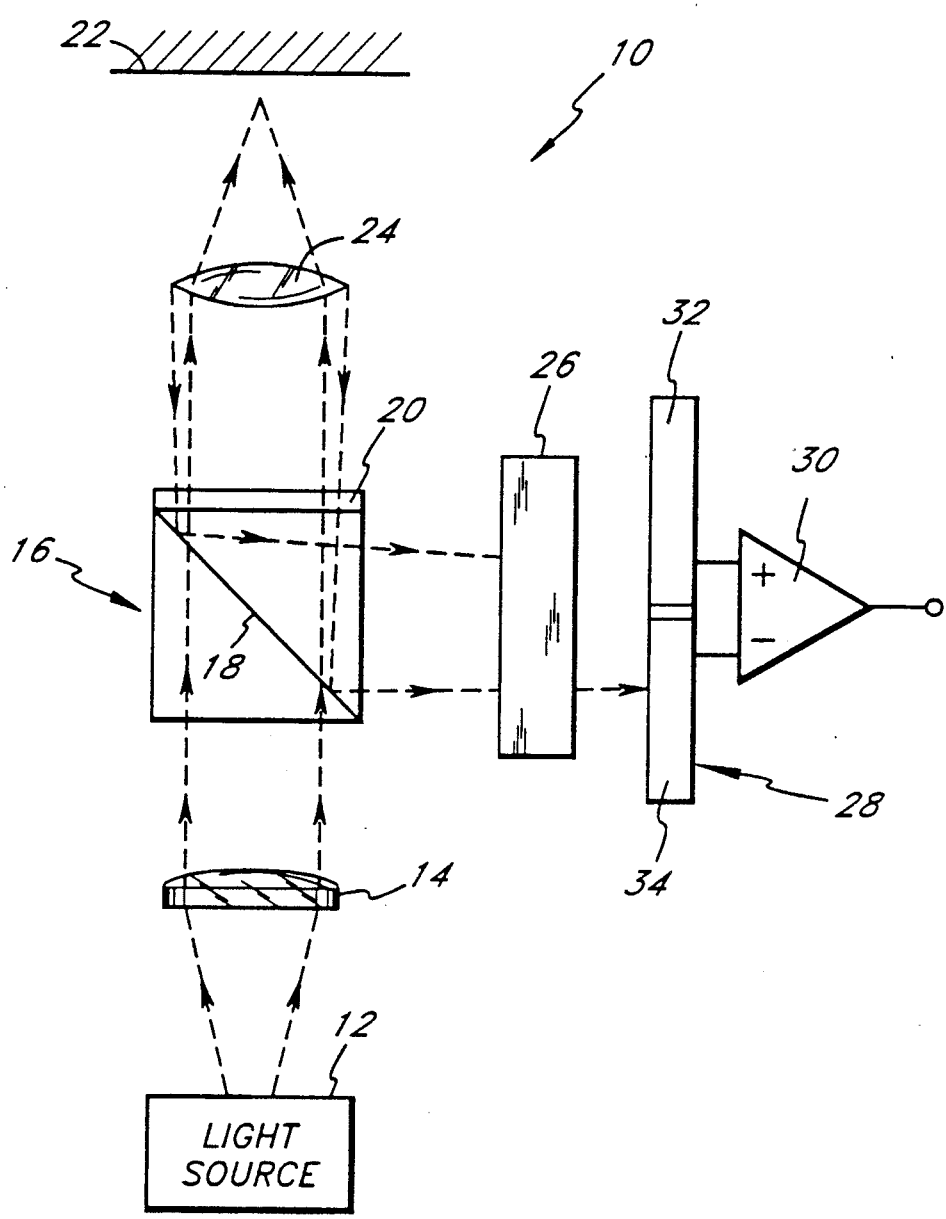
FIG. 2 is a schematic representation of an optical system for detecting the propagation angle of an optical beam in which the beam is focused in front of the disc.
Figure 3:
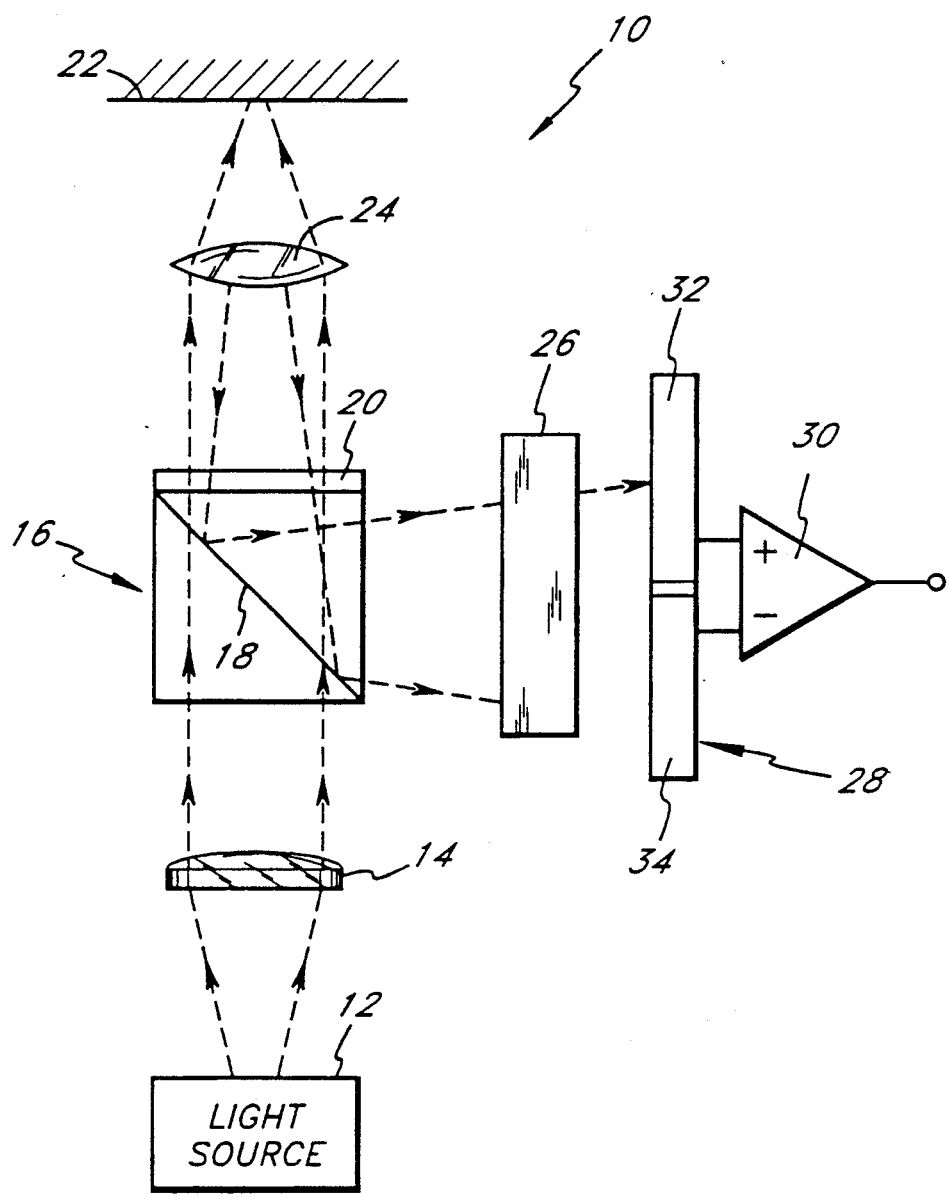
FIG. 3 is a schematic representation of an optical system for detecting the propagation angle of an optical beam in which the beam is focused beyond the surface of the optical disc.

Referring now to the drawings in detail, wherein like reference numerals designate like elements throughout the several views thereof, there is shown generally at 10 in FIGS. 1-3, an optical system for detecting the focus state of an optical beam. As illustrated in these drawing figures, a light source 12, which can be, for example, a semiconductor laser, emits light through a collimating lens 14. The collimating lens 14 renders the incoming light rays substantially parallel and transmits the collimated light toward a beamsplitter 16. The beamsplitter 16 may be a polarization sensitive beamsplitter which possesses a polarization sensitive coating at the beam splitting interface 18. In this configuration, collimated laser light, incident on the beam splitting interface 18, is preferably polarized such that the light will be transmitted by the beamsplitter 16 through a quarter wave plate 20. Upon passing through the quarter wave plate 20, the incident light becomes circularly polarized. This collimated circularly polarized light is then focused onto the surface of an optical disc 22 by an objective lens 24.

A sample of the beam incident upon the optical disc 22 is reflected from the surface of the disc 22 to a focus sensitive optical component 26. Recalling from basic optical principles that the angle of incidence is equal to the angle of reflection, the light beam reflected from the disc 22 will be reflected at an angle equal to the angle of incidence. Thus, if the beam is properly in focus on the recorded surface of the optical disc 22 as schematically illustrated in FIG. 1, the reflected beam will be imaged back onto the same path as the incident light. If, however, the beam is not in focus on the disc, the reflected light beam will deviate from the incident path, as will be further discussed below.

Upon reflection from the disc 22, the reflected beam sample is transmitted back through the objective lens 24 and quarter wave plate 20. The quarter wave plate 20 renders the circularly polarized reflected beam linearly polarized, but shifted in phase by one quarter of a wavelength, or 90 degrees, from that of the incident beam. As the now linearly polarized reflected beam strikes the beam splitting interface 18 of the beamsplitter 16, it is reflected toward the focus sensitive optical component 26, which is positioned in the path of the reflected beam sample. The reflected beam interacts with the optical component 26 in a predictable manner, which will be described in more detail below, such that deviations in the propagation angle of the beam reflected from the disc 22 may be readily measured. This measurement gives an indication of the focus condition of the incident light beam on the surface of the optical disc 22. A detector 28, coupled to a differential amplifier 30 performs the measurement and generates an error signal, indicative of the amount of focal error in the system. In one embodiment, the detector 28 is a split detector, having a first segment 32 and a second segment 34. Each segment 32, 34 of the detector 28 is coupled to an input of the differential amplifier 30. The differential amplifier 30 senses the difference of intensity between the two segments 32, 34 of the detector 28 to generate the focal error signal. This error signal may then be utilized as input to a servo mechanism (not shown) to move the objective lens 24 along the direction of the optical axis of the light beam, i.e., toward and away from the optical disc to adjust for any out-of-focusing conditions.

FIG. 1 schematically illustrates the case where incident light is accurately focused on the recorded surface of the optical disc 22. In this case, the reflected beam sample, as discussed above, will be imaged back onto the same path as the incident light. Thus, in a focused condition, the circularly polarized light reflected from the disc will be substantially collimated after passing back through the objective lens 24. The circularly polarized reflected beam is then transmitted back through the quarter wave plate 20, which renders the light rays linearly polarized, but shifted in phase by 90°. As the reflected beam, which has been shifted in phase by 90°, strikes the beam splitting interface 18 of the beamsplitter 16, it is reflected away from the light source 12, toward the focus sensitive optical component 26. Collimated light reflected by the beam splitting interface 18 of the beamsplitter 16 substantially remains in a collimated state after reflection from the interface 18. The reflected collimated light will pass through the optical component 26 and will cause the detector 28 and the amplifier 30 to generate a signal which indicates that the light incident on the disc 22 is in focus.

FIG. 2 schematically illustrates an under-focused condition in an optical system 10, in which case the light converges to a point in front of the recorded surface of the optical disc 22, thus causing an enlarged light beam to be incident on the surface of the disc. When the incident light beam converges to a point in front of the disc 22, a virtual image of the focal spot is formed on the opposite side of the disc. Since the virtual image appears to originate behind the disc surface, the reflected beam contains convergent light rays after having passed back through the objective lens 24. The uncollimated converging light beam incident on the beam splitting interface 18 of the beamsplitter 16 will remain convergent and uncollimated upon reflection by the beamsplitter 16. The reflected, uncollimated convergent light beam will pass through the optical component 26 and cause the detector 28 and amplifier 30 to generate a signal which indicates that the light incident on the disc is under-focused.

FIG. 3 is illustrative of an over-focused condition in the optical system 10. Here, the optical disc 22 is in front of the focal point of the objective lens 24, i.e., the light rays converge to a point beyond the recorded surface of the optical disc. An over-focused condition, like an under-focused condition is undesirable in that an enlarged light beam is incident on the recorded surface of the disc. In this instance, the reflected light forms a real image in front of the disc. Thus, when the reflected ligh is transmitted back through the objective lens 24, a diverging light beam is generated. The diverging light beam, having its polarization shifted by 90° after passing through the quarter wave plate 20, becomes linearly polarized, but remains divergent after being reflected from the beamsplitter 16. Thus, the reflected beam sample incident on the focus sensitive optical component 26 in an over-focused condition will be an uncollimated diverging light beam. The reflected, uncollimated divergent light beam will pass through the optical component 26 and cause the detector 28 and amplifier 30 to generate a signal which indicates that the light incident on the disc 22 is over-focused.

The collimation state of the reflected beam sample can be analyzed by the optical component 26 and the signal generated by the detector 28 can be utilized as a feedback signal to move the objective lens 24 along the optical axis of the light beam, i.e., either closer to or further away from the optical disc 22 to correct for the under-focused or over-focused condition. The present invention advantageously minimizes the size of the optical system 10 by utilizing a unique optical component 26 which is capable of sensing small changes in the propagation angle, i.e., state of collimation, of an optical beam on a local basis. By sensing the state of collimation or other property of the reflected beam, one can ascertain the focal error within the system and adjust for this error accordingly.

Figure 4:
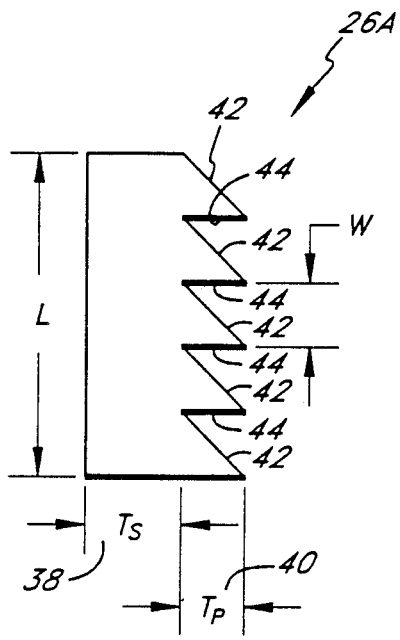
FIG. 4 is a schematic view of an optical element microstructure incorporating an array of microprisms.

FIG. 4 illustrates one embodiment of the optical component 26 comprising an array of microprisms 26A, placed in the path of the reflected beam sample. As illustrated in FIG. 4, the array of microprisms 26A, has a length (L), and a thickness ($T_t$), which may be defined as the sum of the thickness of the non-prism, or substrate portion 38 ($T_s$) plus the thickness of the prisms 40 ($T_p$). The thickness of the prism $T_p$ is dependent upon the number of prisms, k, in the microstructure array 26A, and can be determined by the equation:

$$T_p = \frac{L}{k \sqrt{(n^2 - 1)}}.$$

where:
L = the length of the array of microprisms;
k = the number of microprisms; and
n = the index of refraction of the material forming the microprism array (approximately 1.5 for common glasses and plastics).

Selection of a large number of microprisms is advantageous in that it reduces the effect of any defects or non-uniformities of any single microprism. However, there is a trade-off in that such an optical component having a large number of microprisms is also more difficult to construct. Preferably, each microprism has its hypotenuse 42 positioned near the critical angle for total internal reflection for a collimated beam of parallel incoming light rays. In addition, an absorptive coating 44 may be applied to each microprism in the array as illustrated in FIGS. 4 through 7. Such a coating 44 is commonly used to reduce undesired reflections from surfaces of optical components.

It is known that total internal reflection occurs at the interface of two dielectrics when the light is incident in the denser medium ($n_1 > n_2$) and when the angle of incidence is greater than or equal to the critical angle $\theta_c$, where:

$$\theta_c = \sin^{-1}(n_2/n_1).$$

For an air-glass interface, where air has a refractive index of approximately 1.0 and glass has a refractive index of approximately 1.52, the critical angle is approximately 42°. The angle of the hypotenuse 42 of each microprism is selected so that parallel light rays will be incident upon the hypotenuse 42 at approximately the critical angle, $\theta_c$, such that the surface transmittance is about 50%.

Figure 5:
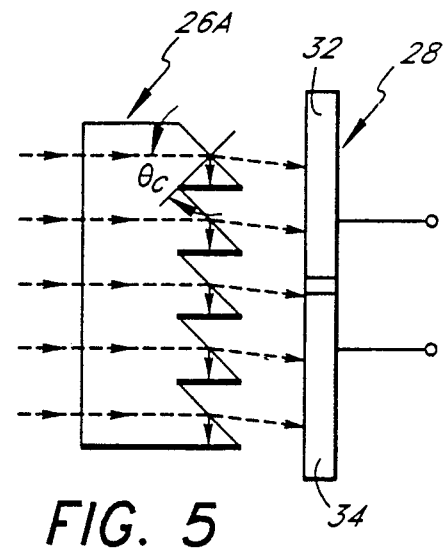
FIG. 5 is a schematic view of the microstructure illustrated in FIG. 4, showing the path of collimated, i.e., parallel, light rays through the microstructure.

In operation, as illustrated in FIG. 5, when the optical system 10 has its objective lens 24 properly focused on the media surface of the optical disc 22, the reflected beam, returning from the disc, will contain substantially collimated light. Thus, the light rays throughout the reflected beam will strike all of the microprisms in the array 26A at substantially the same angle. Ideally, since each microprism in the array 26A of microprisms has been adjusted such that each hypotenuse 42 is near the critical angle such that the surface transmittance is approximately 50%, incident light, in a collimated state, will be partially reflected by each microprism and absorbed by the coating 44 disposed on the horizontal surfaces, and partially transmitted.

In one embodiment, for example, if the critical angle is 41.8°, the hypotenuse of each prism would be adjusted at about 41.6° to achieve a 50% transmittance. Thus, in a focused condition, both segments 32, 34 of the detector 28 will receive substantially equal amounts of light, and the differential sum of the segments 32, 34 will be substantially zero.

It will be recognized that small variations of the individual prism angles and the degree to which the incoming light is not perfectly collimated may cause some light to be transmitted and some light to be totally reflected by the microprism array 26A. On the average, however, with substantially collimated light, the two halves 32, 34 of detector 28 will be uniformly illuminated by any light which passes through the microprism array. When the differential sum of the signals from the first and second segments 32, 34 of the detector 28 is substantially zero, it is indicative that the light beam is properly focused on the disc 22.

Figure 6:
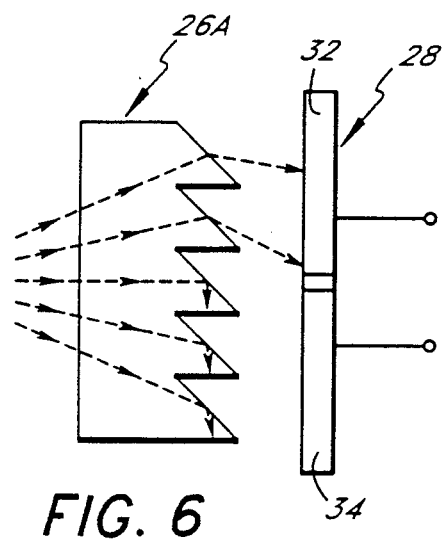
FIG. 6 is a schematic view of the microstructure illustrated in FIG. 4, showing the path of diverging light rays through the microstructure.

If the objective lens 24 converges the forward-going beam to a point beyond the surface of the optical disc, i.e., an over-focused condition, the reflected beam incident upon the microprism array 26A will be an uncollimated divergent light beam. As the divergent light beam falls on the microprism array 26A, light rays which are at angles less than the critical angle $\theta_c$ will be refracted out of the microprisms toward detector 28, while light rays at angles greater than the critical angle will be internally reflected at hypotenuse 42 and absorbed by the absorptive coating 44 disposed on the horizontal surfaces. Thus, as illustrated in FIG. 6, the first segment 32 of the detector 28 will receive a greater amount of light than will the second segment 34 of the detector 28. The differential sum of the signals from the first and second segments 32, 34 of the detector thus becomes non-zero, indicating that the light incident on the disc 22 is over-focused and the degree to which it is over-focused.

Figure 7:
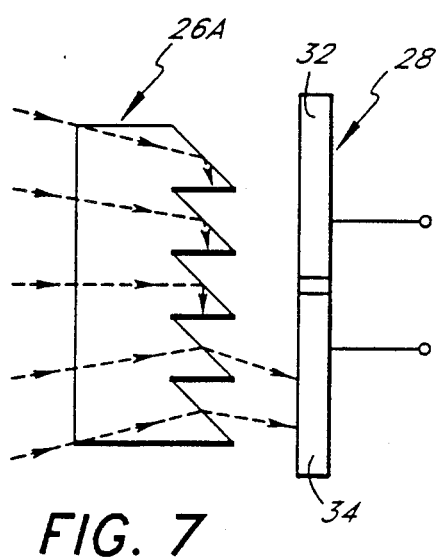
FIG. 7 is a schematic view of the microstructure illustrated in FIG. 4, showing the path of converging light rays through the microstructure.

FIG. 7 schematically illustrates the case where the laser beam converges to a point in front of the surface of the optical disc 22, i.e., an under-focused condition. In this case, uncollimated converging light rays are incident on the microprism array 26A. Once again, light rays striking the hypotenuse 42 of the microprisms at angles greater than the critical angle are internally reflected and absorbed by the absorptive coating 44, while light rays striking the microprisms at angles less than the critical angle are refracted out of each microprism and onto the detector 28. When convergent light rays are present in the reflected beam, the second segment 34 of the detector 28 receives more light than the first segment 32. The signals from the first and second segments of the detector 28 are then summed by a differential amplifier 30, resulting in a non-zero signal, indicating that the light incident on the disc 22 is under-focused and the degree to which it is under-focused.

Figure 8:
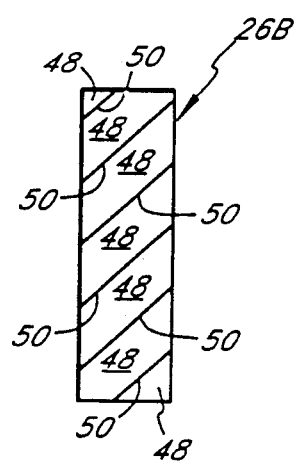
FIG. 8 is a schematic view of an optical element microstructure incorporating a laminar array of critical angle elements.

FIG. 8 schematically illustrates a second embodiment 26B of the focus sensitive optical component. In this embodiment, the focus sensitive optical component 26B comprises a laminar structure, comprising alternating layers of substantially transparent optical plates 48, and light absorptive material 50. In one embodiment, the light absorptive material 50 is in the form of an adhesive, having an index of refraction which is less than the index of refraction of the transparent plates 48. This allows critical angle reflection to take place at each interface within the structure 26B. Like the microprism array 26A, the transparent plates 48 and light absorptive adhesive 50 of the laminar structure 46 are alternately layered at an angle such that entering light, in a collimated state, will be near the critical angle $\Theta_c$ where the surface transmittance is approximately 50%.

Figure 9:
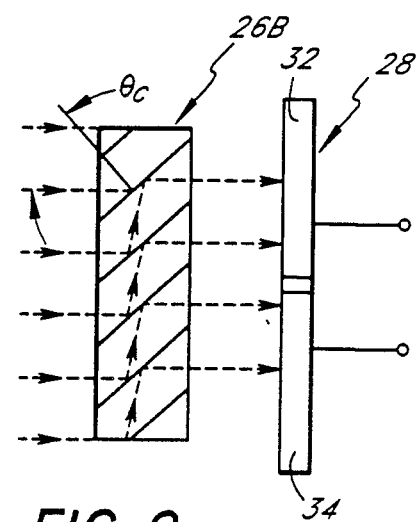
FIG. 9 is a schematic view of the microstructure illustrated in FIG. 8, showing the path of collimated, i.e., parallel, light rays through the microstructure.

FIG. 9 schematically illustrates the case where the light spot is accurately focused on the surface of the optical disc 22. In this case, substantially collimated light will be reflected by the beam splitting interface 18 of the beamsplitter 16 (FIG. 1), onto the laminar structure 26B. If the reflected beam strikes the interface between absorptive material 50 and the transparent plates 48 at angles greater than or equal to the critical angle, the incident beam will be reflected. Each time the beam strikes a laminar interface, it will be reflected at the angle of incidence, and will eventually be refracted out of the laminar structure 26B. In a focused condition, incident light will be substantially collimated normal to the laminar structure 26B, and will thus strike the laminar structure 26B at approximately the critical angle. Thus, the incident light will be reflected at each laminar interface, until it is eventually refracted out of the laminar structure 26B and onto the detector 28. As illustrated in FIG. 9, both segments 32, 34 of the split detector 28 receive substantially the same amount of light when the reflected beam is focused on the surface of the optical disc 22. This is due to the fact that the light rays incident upon the laminar structure 26B are substantially collimated. Thus, the differential sum of the signals produced by each half 32, 34 of the split detector 28 will be zero, indicating that the objective lens 24 is at the proper distance from the optical disc 22 for accurate reading of the information recorded thereon.

Figure 10:
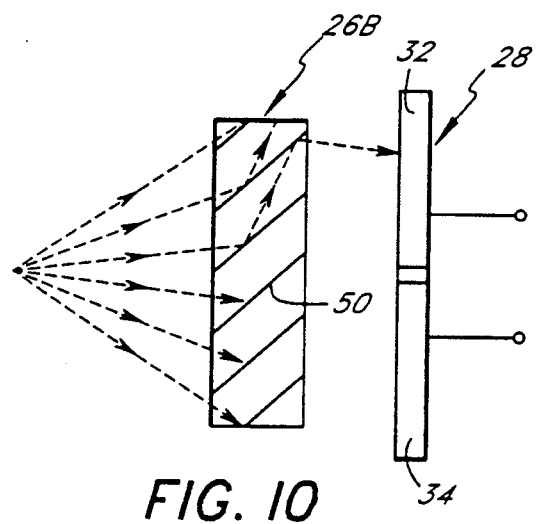
FIG. 10 is a schematic view of the microstructure illustrated in FIG. 8, showing the path of diverging light rays through the microstructure.

When the incident light comes to focus at a point beyond the surface of the disc 22, i.e., an over-focused condition, divergent light rays will be contained in the reflected beam incident upon the laminar structure 26B. Thus, as viewed in FIG. 10, light rays contained in the top half of the reflected beam strike the laminar structure 26B at a more grazing angle than the light rays contained in the bottom half of the reflected beam. Accordingly, the light rays striking the upper half of the laminar structure 26B will be at angles greater than the critical angle, and will thus be reflected at the laminar interface between the absorptive material 50 and the transparent plates 48 at the angle of incidence. Thus, as the light rays propagate through the laminar structure 26B, they will be reflected each time the light strikes a laminar interface, and will eventually be refracted out of the laminar structure. Conversely, the light rays striking the lower half of the laminar structure will be at a steeper angle. If this steeper angle is less than or equal to the critical angle, light striking each interface will be absorbed by the absorptive material 50. Light rays incident on the upper half of the laminar structure 26B are reflected by the transparent plate absorptive material interface and refracted out of the laminar structure 26B. Light rays incident on the lower half of the laminar structure are absorbed in the layers 50. Therefore, the second segment 32, of the detector 28 will receive a greater amount of light than segment 34. Each segment 32, 34 of the detector 28 generates a signal proportional to the amount of light received. The differential sum of these signals whose magnitude and sign are related to the convergence or divergence characteristics of the incident light is then utilized as input to a focus servo (not shown), indicating the amount and direction of the correction needed. In this example, the sign of the differential sum will indicate that the beam incident on the disc 22 is over-focused and the amplitude will be proportional to how far it is over-focused.

Figure 11:
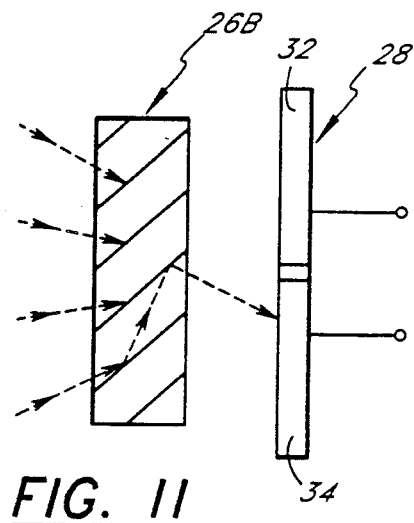
FIG. 11 is a schematic view of the microstructure illustrated in FIG. 8, showing the path of converging light rays through the microstructure.

FIG. 11 schematically illustrates the case where convergent light rays, indicative of an under-focused condition at the disc, are incident on the laminar structure 26B. In this case, as viewed in FIG. 11, light rays contained in the top half of the reflected beam strike the laminar interfaces at a steep angle, while light rays contained in the lower half of the reflected beam strike the lower half of the laminar structure at a more grazing angle. Thus, as discussed above, light incident on the laminar structure 26B at steep angles, which are less than or equal to the critical angle will be absorbed by the absorptive material 50. Conversely, the light incident on the laminar interface at the more grazing angles, if greater than the critical angle, will be reflected at each laminar interface, and refracted out of the laminar structure 26B. Once again, one segment 34 of the detector 28 will receive a greater amount of illumination than the other segment 32. The difference in the amounts of illumination incident on each half 32, 34 of the detector is then used to determine the degree of focal error present as discussed above.

Figure 12:
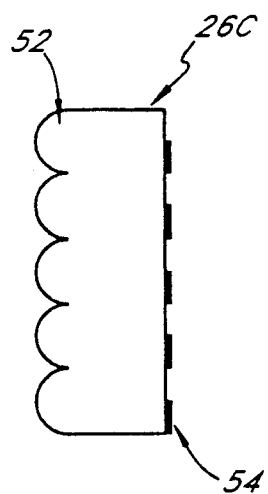
FIG. 12 is a schematic view of an optical element microstructure incorporating an array of microlenses.

FIG. 12 illustrates yet another embodiment 26C of the focus sensitive optical component, consistent with the present invention. In this embodiment, the focus sensitive optical component comprises an array of cylindrical microlenses 52, coupled to a corresponding array of grating bars 54. Preferably, each cylindrical microlens in the array 52 has substantially the same radius of curvature so that all of the microlenses in the array have substantially the same focal length. Each lens-bar pair is constructed and arranged to operate on the knife-edge principle. Thus, the array of grating bars 54 is situated so that the focal point of each microlens is at an edge of one of the grating bars so that a one-to-one relationship is established between each grating bar in the array of grating bars 54 and each microlens in the array of microlenses 52. The grating bars preferably comprise some form of light absorptive material, and are spaced at predetermined intervals.

Figure 13:
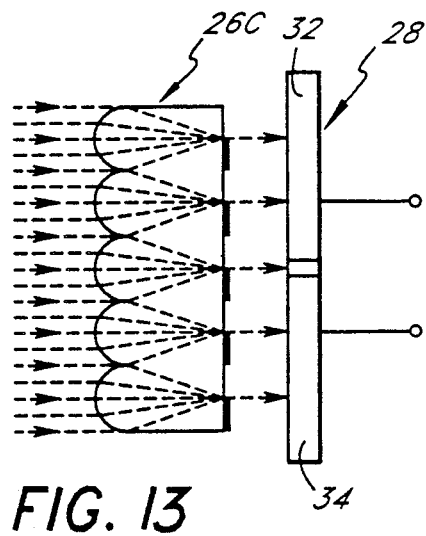
FIG. 13 is a schematic view of the microstructure illustrated in FIG. 12, showing the path of collimated, i.e., parallel, light rays through the microstructure.
Figure 14:
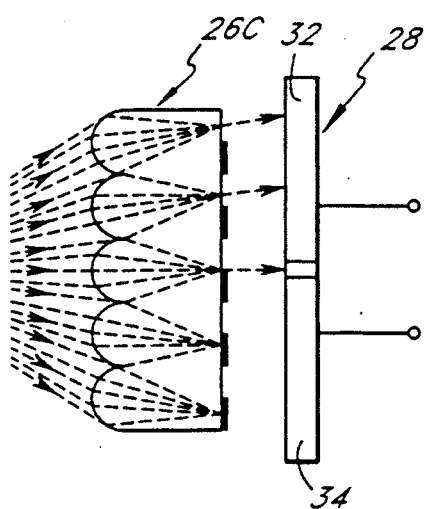
FIG. 14 is a schematic view of the microstructure illustrated in FIG. 12, showing the path of diverging light rays through the microstructure.

As illustrated in FIGS. 12 through 15, the microlens array 52, coupled to the grating bar array 54 is constructed and arranged to sense the collimation state of light incident upon the device. Like the two preceding embodiments, collimated light incident on the device is indicative of a focused condition, divergent light corresponds to an over-focused condition, and convergent light is representative of an under-focused condition. FIG. 13 schematically illustrates the path of collimated or parallel light rays through the microstructure 26C. As viewed in FIG. 13, collimated light, i.e., light which is substantially perpendicular to the surface of the microstructure 26C, is incident on the array microlenses 52. Each microlens in the array of microlenses 52 will converge a portion of the light to a point which just grazes an edge of its corresponding grating bar. Thus, both segments 32, 34 of the detector 28 will receive substantially equal amounts of light, indicative of an in-focus condition.

Decollimated light, indicative of an out-of-focus condition, may assume one of two forms: convergent or divergent. In the divergent case, indicative of an over-focused condition, illustrated schematically in FIG. 14, light rays in the upper half of the decollimated light beam are focused by the microlenses in the upper half of the array so that the light is directed between the grating bars, and onto the detector 28. Conversely, light rays contained in the lower half of the divergent light beam will be focused by each microlens in the lower half of the array so that the light is directed to a point within its associated grating bar and will be absorbed. Thus, substantially no light will be transmitted to the second segment 34 of the detector 28.

Figure 15:
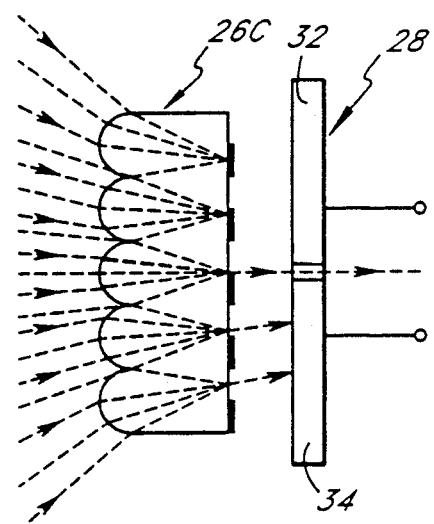
FIG. 15 is a schematic view of the microstructure illustrated in FIG. 12, showing the path of converging light rays through the microstructure.

When the light rays contained in the reflected beam are convergent, indicative of an under-focused condition, the opposite holds true. As schematically depicted in FIG. 15, light rays striking the upper portion of the microstructure 26C will be focused by the microlenses in the upper half of the array 52 so that the light is directed to points within each microlens' associated grating bar. Thus, substantially all of the light in the reflected beam incident on the upper half of the microstructure 26C will be absorbed by the array of grating bars 54 so that substantially no light will be incident on the first segment 32 of the detector 28. However, light rays in the lower half of the convergent beam will be focused by each microlens in the lower half of the microstructure 26C such that the light is directed through the spaces between the grating bars and onto the second segment 34 of the detector 28.

As in the above-described embodiments, each segment 32, 34 of the detector 28 generates a signal proportional to the amount of light received. The differential sum of these signals, whose magnitude and sign are related to the convergence or divergence characteristics of the beam sample, is then utilized as input to a focus servo (not shown), indicating the amount and direction of the correction needed.

Figure 16:
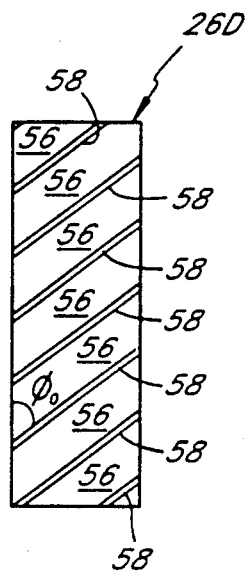
FIG. 16 is a schematic view of an optical element microstructure incorporating a laminar array of interference filter elements.

FIG. 16 illustrates still another embodiment of the present invention in which the focus sensitive optical component 26D comprises an array of transparent optical plates 56, each having a highly reflective interference filter element 58 applied to its lower surface. Preferably, each interference filter element 58 comprises a multilayer interference coating and is tuned to a specific wavelength.

As with all of the previous embodiments, the focus sensitive optical component 26D will transmit a substantially uniform amount and intensity of light in response to collimated incident light, signifying that the objective lens 24 is properly focused on the disc 22. However, if the incident light of the beam sample is decollimated, i.e., contains either divergent or convergent rays, an out-of-focus state is established.

Figure 17:
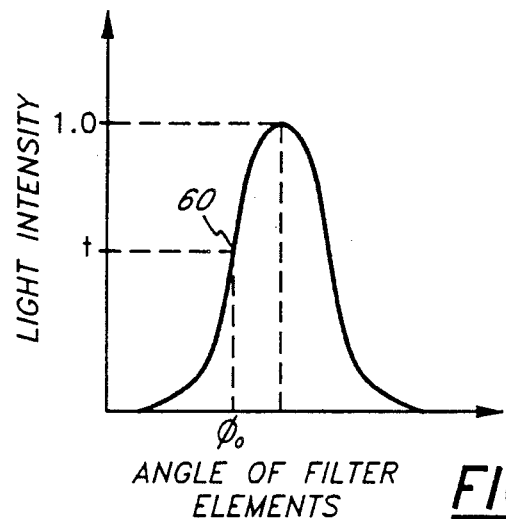
FIG. 17 is a graphical representation of an exemplary characteristic curve of transmitted light intensity as a function of the angle of the filter elements.

Preferably, each filter element 58 is adjusted at a predetermined angle $\phi_0$ with respect to the optical axis of the sample beam. FIG. 17 is a graphical illustration of a general characteristic curve for an interference filter element, showing light intensity transmitted through the filter as a function of the angle of incidence of the light on the filter. By selecting the angle $\phi_0$ of the interference elements 58 such that light enters on a steep slope portion of this curve 60, the angular sensitivity of filter element is enhanced. As can be readily seen by viewing FIG. 17, small deviations in the angle of incidence of light results in very large changes in light intensity. Thus, at angles below $\phi_0$, the light intensity is low, or appears dull. Conversely, at angles above $\phi_0$, the light intensity is high, or appears bright. The difference in light intensity incident on the two halves 32, 34 split detector 28 can thus be utilized to determine the state of collimation of the sample beam. This is shown in U.S. Pat. No. 4,504,938 to Tajima, which is incorporated herein by reference.

Figure 18:
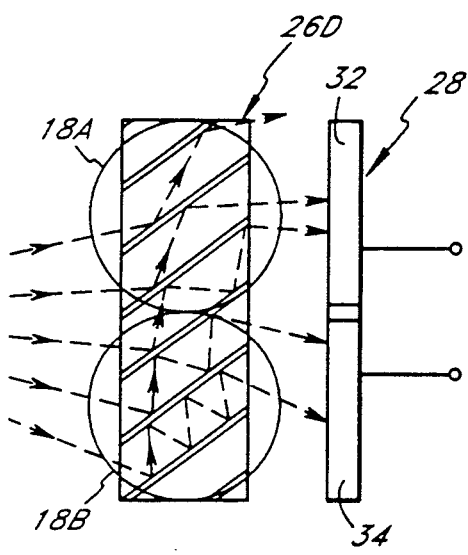
FIG. 18 is a schematic view of the microstructure illustrated in FIG. 16, showing the path of diverging light rays through the microstructure.
Figure 18A:
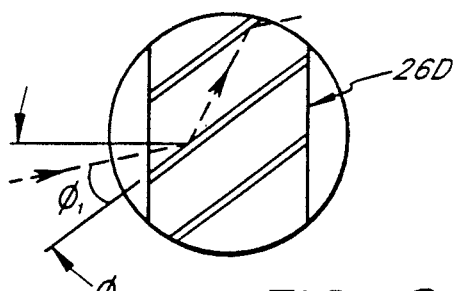
FIG. 18a is an enlarged schematic view of a divergent light ray propagating through an upper portion of the microstructure illustrated in FIG. 18.
Figure 18B:
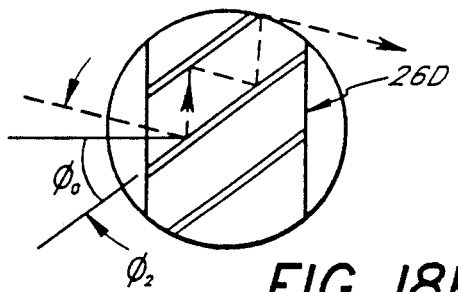
FIG. 18b is an enlarged schematic view of a divergent light ray propagating through a lower portion of the microstructure illustrated in FIG. 18.

FIG. 18 schematically illustrates a first out-of-focus condition in which the light rays contained in the sample beam are divergent. Preferably, as illustrated in FIG. 18, each light ray undergoes at least two reflections prior to being transmitted through the microstructure 26D, and some light is transmitted regardless of the position at which it is incident on the optical component 26D. However, as illustrated in enlargement circle A, in FIG. 18a, the angle $\phi_1$ at which light strikes the interference element 58 is less than $\phi_0$. Thus, from looking at the characteristic curve shown in FIG. 17, one will see that the diverging light rays transmitted by the upper half of the optical component 26D are of a lesser intensity than collimated light rays striking the region. Conversely, with reference to FIG. 18b, enlargement circle B, diverging light rays transmitted by the lower half of the optical component 26D strike the interference elements 58 at angles $\phi_2$ which are greater than $\phi_0$, and thus are brighter than would be collimated rays. It will be appreciated however, that the light rays contained in the sample beam may be transmitted through the microstructure 26D after having been reflected only once.

Figure 19:
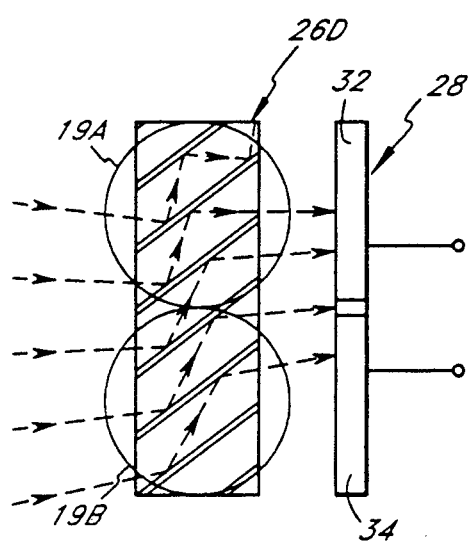
FIG. 19 is a schematic view of the microstructure illustrated in FIG. 16, showing the path of converging light rays through the microstructure.
Figure 19A:
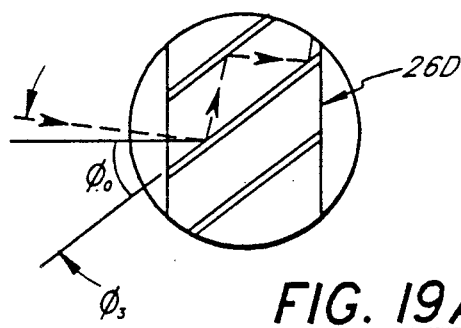
FIG. 19a is an enlarged schematic view of a convergent light ray propagating through an upper portion of the microstructure illustrated in FIG. 21.
Figure 19B:
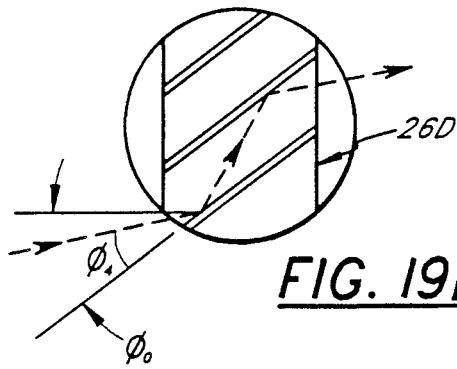
FIG. 19b is an enlarged schematic view of a convergent light ray propagating through a lower portion of the microstructure illustrated in FIG. 19.

FIG. 19 schematically illustrates the opposite out-of-focus condition in which the light rays contained in the sample beam are convergent. As illustrated in FIG. 19, each light ray undergoes at least two reflections prior to being transmitted through the microstructure 26D, and, as above, some light is transmitted regardless of the position on the component 26D upon which it strikes. However, as illustrated in enlargement circle A, in FIG. 19a, the angle $\phi_3$ at which light strikes the interference element 58 is greater than $\phi_0$. Thus, from looking at the characteristic curve shown in FIG. 17, one will see that the light rays contained in the upper half of the convergent light beam will be transmitted with a greater intensity than that of collimated light rays. Conversely, with reference to FIG. 19b, enlargement circle B, light rays contained in the lower half of the convergent ray strike the interference elements 58 at angles $\phi_4$ which are less than $\phi_0$, and will be transmitted with less intensity than would be collimated rays.

The difference in the intensity of light rays striking the two halves 32, 34 of the detector 28 is utilized to generate a focus error signal. When the upper half 32 of the detector 28 receives a greater intensity of light than the lower half 34 of the detector, it is an indication that the beam sample contains convergent light rays and the lens 24 is under-focused on the disc. Conversely, when the upper half 32 of the detector 28 receives a lesser intensity of light than the lower half 34, it is an indication that the beam sample contains divergent rays, signifying an over-focused condition.

Many other modifications and alternative embodiments of the invention will be apparent to those skilled in the art in view of the foregoing description. The details of the structure may be varied substantially without departing from the spirit of the invention, and the exclusive use of all modifications which come within the scope of the appended claims is reserved.

What is claimed is:

1. An optical apparatus for detecting focal position comprising:
   a light source for producing a beam of light;
   a substantially planar optical element array comprising a plurality of microstructure optical elements wherein each of said microstructure optical elements intercepts a small portion of said light beam in a manner which changes the direction of propagation of said light as it propagates through said microstructure optical element; and
   a light detector for receiving said light after propagation through said microstructure optical elements.

2. An apparatus as defined by claim 1, wherein each of said microstructure optical elements comprises a microprism.

3. An apparatus as defined by claim 2, wherein each of said microprisms has a hypotenuse positioned approximately at the critical angle for total internal reflection of incoming parallel light rays.

4. An apparatus as defined by claim 3, wherein an absorptive coating is applied to a side of each of said microprisms adjacent said hypotenuse to reduce undesired reflections.

5. An apparatus as defined by claim 1, wherein said planar optical element array comprises an array of converging microlenses.

6. An apparatus as defined by claim 5, further comprising an array of grating bars, correspondingly coupled to said array of microlenses so that each microlens has an associated grating bar.

7. An apparatus as defined by claim 6, wherein said array of grating bars is adjusted in relation to said array of microlenses so that each microlens converges incoming parallel light rays to an edge of its associated grating bar.

8. An apparatus as defined by claim 1, wherein said planar optical element array comprises a laminar structure, having a plurality of laminar interfaces comprising alternating layers of substantially transparent optical plates and light absorptive material.

9. An apparatus as defined by claim 8, wherein each of said laminar interfaces is positioned approximately at the critical angle for total internal reflection for incoming parallel light rays.

10. An apparatus as defined by claim 1, wherein said planar optical element array comprises an alternating array of interference filter elements and substantially transparent optical plates.

11. An apparatus as defined by claim 10, wherein said interference filter elements are adjusted such that incident light rays are reflected at least twice within said planar optical element array.

12. An angle sensing apparatus, comprising:
   a light source;
   a collimating lens, positioned in the path of said light source;
   a beam splitter, having a polarization sensitive beam splitting interface, said beamsplitter constructed and arranged to transmit light received from said collimating lens;
   a quarter wave plate;
   an objective lens for converging said light onto a reflective surface from which a portion of said light is reflected;
   a substantially planar optical microstructure angle deviation analyzing element disposed within the path of said reflected light, wherein said microstructure element transmits light in a manner which changes the direction of propagation of said reflected light as it propagates through said microstructure; and
   a light detector, having at least two independent light sensitive regions, said light detector constructed and arranged in relation to said microstructure to generate a signal corresponding to the angle deviation of said reflected light.

13. An angle sensing apparatus as defined by claim 12, wherein said optical microstructure angle deviation analyzing element comprises a plurality of microprisms which are small compared to said reflected light.

14. An angle sensing apparatus as defined by claim 13, wherein each of said microprisms has a hypotenuse positioned approximately at the critical angle for total internal reflection of incoming parallel light rays.

15. An angle sensing apparatus as defined by claim 14, wherein an absorptive coating is applied to a side of each of said microprisms adjacent said hypotenuse to reduce undesired reflections.

16. An angle sensing apparatus as defined by claim 12, wherein said planar optical element array comprises an array of converging microlenses.

17. An angle sensing apparatus as defined by claim 16, further comprising an array of grating bars, correspondingly coupled to said array of microlenses so that each microlens has an associated grating bar.

18. An angle sensing apparatus as defined by claim 17, wherein said array of grating bars is adjusted in relation to said array of microlenses so that each microlens converges incoming parallel light rays to an edge of its associated grating bar.

19. An angle sensing apparatus as defined by claim 12, wherein said planar optical element array comprises a laminar structure, having a plurality of laminar interfaces comprising alternating layers of substantially transparent optical plates and light absorptive material.

20. An angle sensing apparatus as defined by claim 19, wherein each of said laminar interfaces is positioned approximately at the critical angle for total internal reflection of incoming parallel light rays.

21. An angle sensing apparatus as defined by claim 12, wherein said planar optical element array comprises an alternating array of interference filter elements and substantially transparent optical plates.

22. An angle sensing apparatus as defined by claim 21, wherein said interference filter elements are adjusted such that incident light rays are reflected at least twice within said planar optical element array.

23. An optical apparatus for detecting focal position comprising:
   a light source for producing a beam of light;
   a substantially planar optical element array comprising a plurality of microprisms wherein each of said microprisms intercepts a small portion of said light beam; and
   a light detector comprising at least two substantially independent light sensitive regions for receiving said light after propagation through said microstructure optical elements.

24. An apparatus as defined by claim 23, wherein each of said microprisms has a hypotenuse positioned approximately at the critical angle for total internal reflection of incoming parallel light rays.

25. An apparatus as defined by claim 24, wherein an absorptive coating is applied to a side of each of said microprisms adjacent said hypotenuse to reduce undesired reflections.

26. An optical apparatus for detecting focal position comprising:
   a light source for producing a beam of light;
   a substantially planar optical element array comprising a plurality of converging microlenses wherein each of said microlenses intercepts a small portion of said light beam; and
   a light detector comprising at least two substantially independent light sensitive regions for receiving said light after propagation through said microstructure optical elements.

27. An apparatus as defined by claim 26, further comprising an array of grating bars, correspondingly coupled to said array of microlenses so that each microlens has an associated grating bar.

28. An apparatus as defined by claim 27, wherein said array of grating bars is adjusted in relation to said array of microlenses so that each microlens converges incoming parallel light rays to an edge of its associated grating bar.

29. An optical apparatus for detecting focal position comprising:
   a light source for producing a beam of light;
   a substantially planar optical element array comprising a laminar structure, having a plurality of laminar interfaces comprising alternating layers of substantially transparent optical plates and light absorptive material, wherein each of said laminar interfaces intercepts a small portion of said light beam; and
   a light detector comprising at least two substantially independent light sensitive regions for receiving said light after propagation through said microstructure optical elements.

30. An apparatus as defined by claim 30, wherein each of said laminar interfaces is positioned approximately at the critical angle for total internal reflection of incoming parallel light rays.

31. An optical apparatus for detecting focal position comprising:
   a light source for producing a beam of light;
   a substantially planar alternating array of interference filter elements and substantially transparent optical plates wherein each of said interference filter elements intercepts a small portion of said light beam in a manner which changes the direction of propagation of said light as it propagates through said microstructure optical element; and
   a light detector comprising at least two substantially independent light sensitive regions for receiving said light after propagation through said microstructure optical elements.

32. An apparatus as defined by claim 31, wherein said interference filter elements are adjusted such that incident light rays are reflected at least twice within said planar optical element array.

33. A method for detecting focus position comprising the steps of:
   producing a beam of light;
   acquiring a sample of said beam of light;
   intercepting said beam sample with a substantially planar optical element array comprising a plurality of microstructure optical elements wherein each of said microstructure optical elements intercepts a small portion of said beam sample in a manner which changes the direction of propagation of said light as it propagates through said microstructure optical element; and
   detecting said light after propagation through said microstructure optical elements with a detector.

34. An apparatus for sensing the collimation state and angle of a light beam, comprising:
   a substantially planar optical microstructure angle deviation analyzing element disposed within the path of said light beam, wherein said microstructure element transmits light in a manner which changes the direction of propagation of said light beam as it propagates through said microstructure; and
   a light detector, constructed and arranged in relation to said microstructure to generate a signal corresponding to the angle of said light beam.

* * * * *